C. B. SMITH & L. L. MILLER.
PLANTER.
APPLICATION FILED JUNE 30, 1916.
1,218,961.
Patented Mar. 13, 1917.
3 SHEETS—SHEET 1.
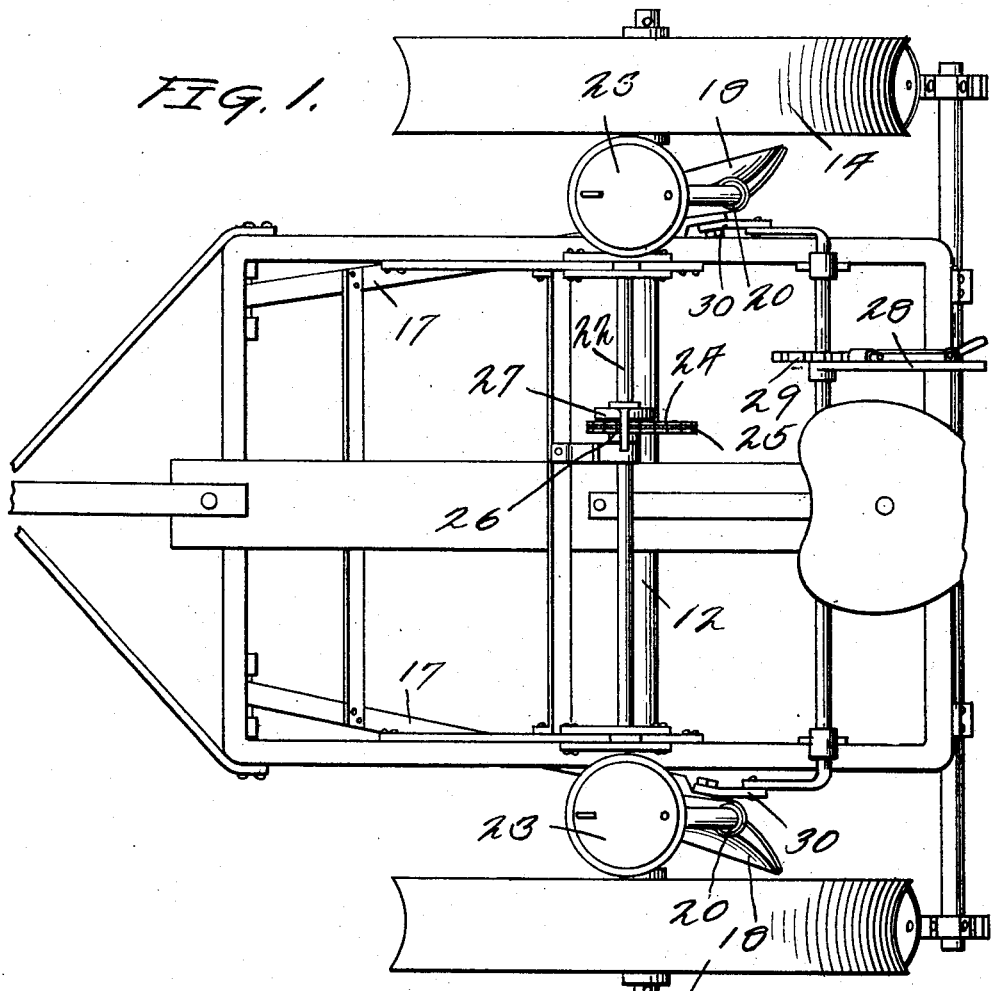
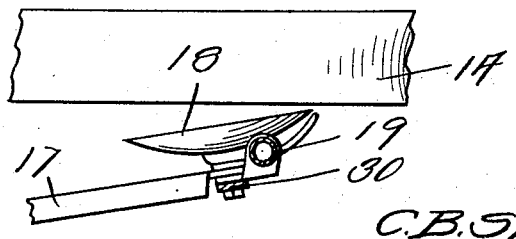

C. B. SMITH & L. L. MILLER.
PLANTER.
APPLICATION FILED JUNE 30, 1916.
1,218,961.
Patented Mar. 13, 1917.
3 SHEETS—SHEET 2.
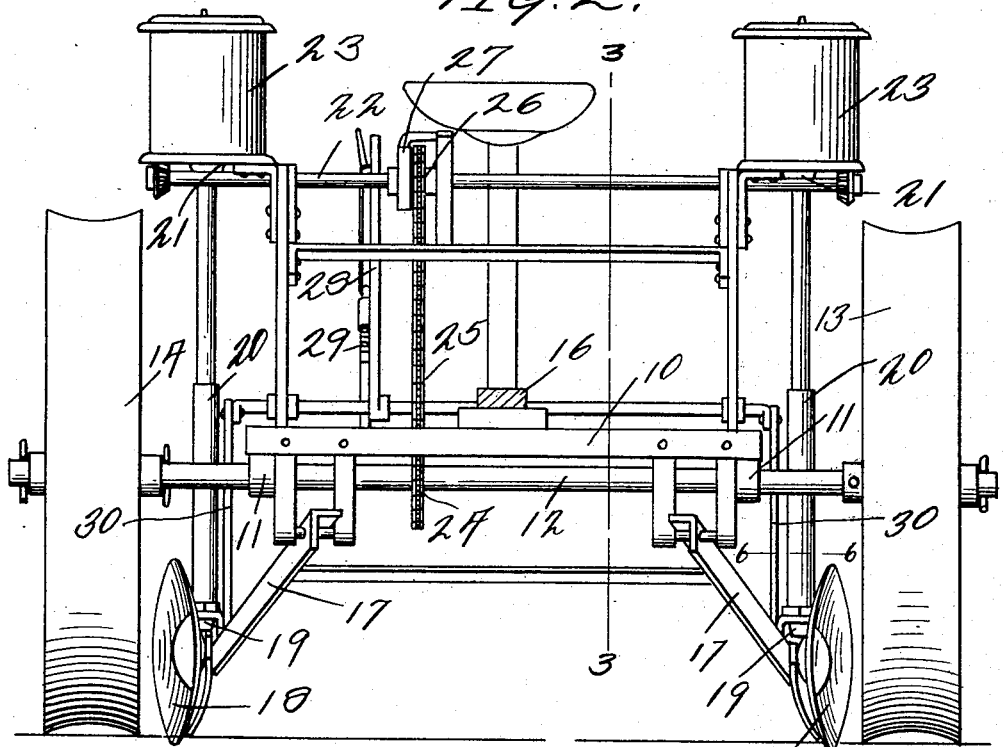
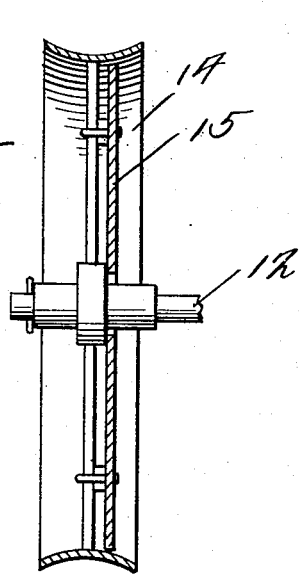
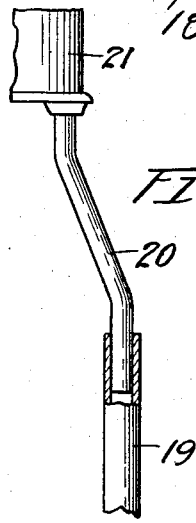

C. B. SMITH & L. L. MILLER.
PLANTER.
APPLICATION FILED JUNE 30, 1916.
1,218,961.
Patented Mar. 13, 1917.
3 SHEETS—SHEET 3.
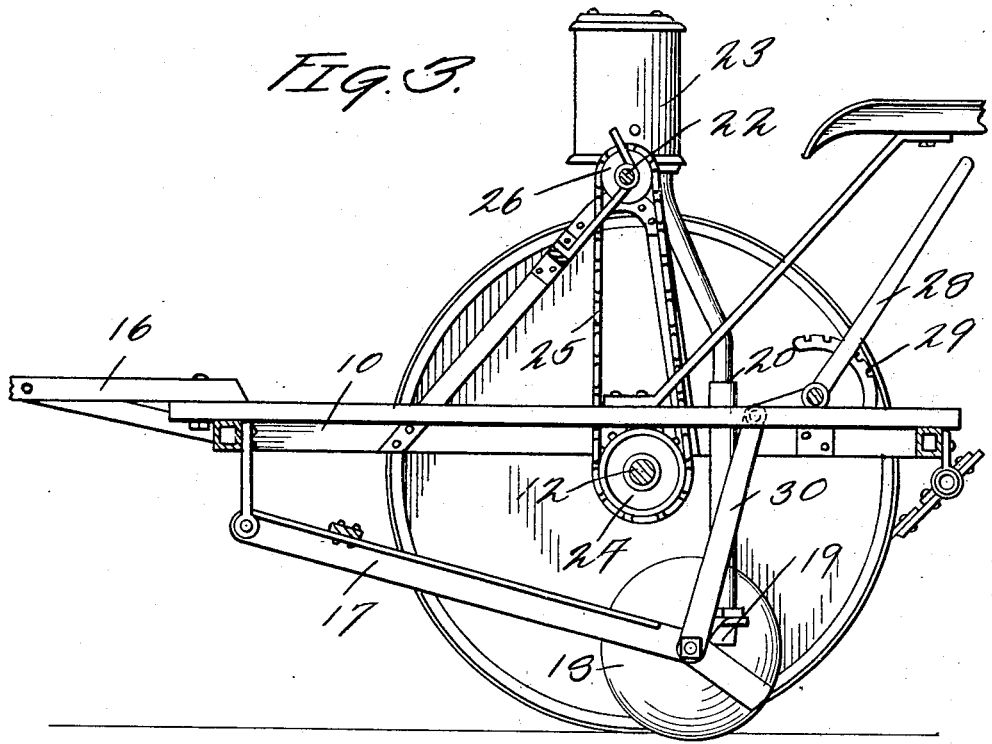
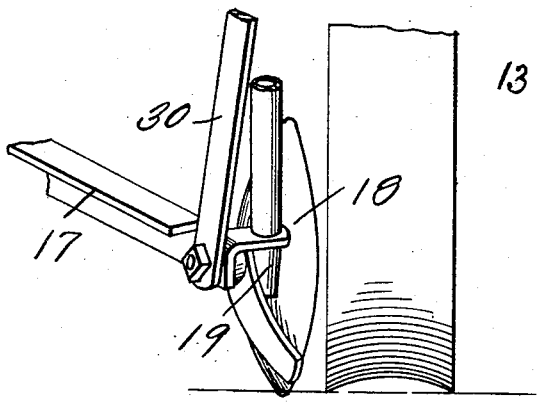
Witnesses
Inventor
C. B. Smith
L. L. Miller
Attorneys

UNITED STATES PATENT OFFICE.

CHARLES B. SMITH AND LINWOOD L. MILLER, OF JACKSON, TENNESSEE.

PLANTER.

1,218,961.     Specification of Letters Patent.     Patented Mar. 13, 1917.

Application filed June 30, 1916. Serial No. 106,860.

*To all whom it may concern:*

Be it known that we, CHARLES B. SMITH and LINWOOD L. MILLER, citizens of the United States, residing at Jackson, in the county of Madison, State of Tennessee, have invented certain new and useful Improvements in Planters; and we do hereby declare the following to be a full, clear, and exact description of the invention, such as will enable others skilled in the art to which it appertains to make and use the same.

This invention relates to agricultural implements and has special reference to a planter.

The principal object of the invention is to improve and simplify the general construction of devices of this character.

A second important object of the invention is to provide a planter wherein the ground or supporting wheels will also act to cover the planted seed in the furrow.

A third important object of the invention is to provide a planter of this description wherein the furrow opener will throw the displaced earth on the inside of the rim of the ground wheels in advance of the dropped seed while the ground wheel will cause such earth to roll off thereof in rear of the dropped seed.

A fourth important object of the invention is to provide a planter of improved construction having ground wheels and furrow opening disks, the latter being so arranged as to throw the displaced earth onto the rim of the ground wheel and being adjustable relative to said wheel so that the depth of the furrow and the amount of earth delivered to the ground wheels may be regulated.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1 is a plan view of a planter constructed in accordance with this invention;

Fig. 2 is a front elevation thereof;

Fig. 3 is a detail section on the line 3—3 of Fig. 2;

Fig. 4 is a detail view from the rear of the machine showing the relation between the furrow opener and ground wheel.

Fig. 5 is a detail section through the rim of one of the ground wheels showing the guard plates;

Fig. 6 is a detail sectional view on the line 6—6 of Fig. 2, showing the peculiar relationship of the ground wheel, its disk, and the seed boot;

Fig. 7 is a detail section showing the telescopic seed tube.

In the embodiment of the invention herein illustrated there is disclosed a frame 10 which carries bearings 11 and in these bearings is journaled the axle 12. Fixedly connected to one end of this axle is a ground wheel 13, the remaining ground wheel 14 being mounted on the axle to freely rotate so that the device may turn corners readily. Each of these ground wheels 13 and 14 has a rim which is arcuate in cross section, the concave side of the rim facing outward and thus providing a construction which, in that portion contacting with the ground, slants downward from the center line of the rim to each side. Moreover each of the rims of said wheels is provided with an internal flange or guard plate 15 which is positioned centrally of the rim so that earth thrown onto the rim will not pass through the wheel, but, as the wheel revolves, will roll back off the wheel adjacent the path thereof.

Connected to the main frame is the usual draft appliance for the attachment of the draft animals, the tongue of the appliance being indicated at 16.

Pivotally connected to the main frame is a supplemental frame 17 on which is mounted the disk furrow openers 18. These disks 18 are so positioned relative to the ground wheels 13 and 14 that the earth which is removed from the furrow by said disk is thrown onto the inside of the rim of the ground wheel and, as the latter rotates, this earth will roll off the ground wheel in the rear of said disk, and at a slight space therefrom. Fixed also to this supplementary frame is a boot 19, said boot being arranged to lie immediately behind the respective disk and between the points at which the furrow is opened and the point where the earth is delivered from the ground wheel. This boot 19 is connected by means of the telescopic tube 20 with the dropper mechanism indicated in general at 21 and including the dropper shaft 22. This dropper mechanism has not been illustrated in detail as any preferred form may be used and the same does not form a part of this invention in its details. Consequently the indication shown at 21 is to be taken merely as typical of any preferred dropper mechanism. Mounted above these dropper mechanisms 21 are the hoppers 23 for the reception of the seed.

On the axle 12 is a sprocket 24 which is connected by a chain 25 with a sprocket 26 revolving freely on the shaft 22 and adapted to be clutched thereto by the clutch mechanism 27.

At 28 is a latch lever working over a quadrant 29 and connected to this latch lever are the links 30 by means of which the supplementary frame may be raised or lowered at will so that the disks and boots may be adjusted relative to the ground wheels. These links are suitably connected, for this purpose, to said supplementary frame.

In the operation of the invention, the disks will open the furrows and at the same time throw the earth onto the ground wheels. This earth will be prevented from passing through the wheels by the internal flanges or guard plates. In the furrows thus opened the seed will be dropped through the boot, the dropper mechanisms being clutched to rotate with the shaft or axle 12. After the seed has been dropped, the rotation of the wheels 13 and 14 will cause the earth carried on the inside of their rims to roll off and cover the seed and it is to be noted that this seed is covered lightly and the earth is not packed down as is the case where a covering roller is used.

It will be noted that owing to the construction employed, the draft of the implement is very light since only the furrow forming disks penetrate the earth, all covering blades and the like being eliminated.

Moreover, owing to the simplicity of construction the implement is difficult to disarrange and can be used effectively in rough ground as well as smooth. When used in rough ground, it will be seen that the disks follow exactly the movements of the ground wheels so that the seed is planted at an even depth, without respect to the roughness of said ground.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

1. In a planter, a ground wheel having means to prevent earth passing therethrough, a furrow opener arranged to throw the displaced earth from the furrow inside the rim of the ground wheel, and a seed delivery device arranged in rear of the furrow opener.

2. In a planter, a ground wheel, a furrow opening disk positioned beside the ground wheel and arranged to throw the earth from the furrow onto the inner surface of the rim, a guard plate carried by the wheel to prevent the earth from passing therethrough, and a seed delivery device arranged in rear of the disk.

3. In a planter, a ground wheel having a rim inclined away from the axis of the wheel from the center line of the rim to its edges, a guard plate fixed within the wheel to bear against the central portion of the rim, a furrow opener arranged to throw the displaced earth onto the inner side of the rim and a seed delivery device in rear of said opener.

4. In a planter, a ground wheel having a rim inclined away from the axis of the wheel from the center line of the rim to its edges, a guard plate fixed within the wheel to bear against the central portion of the rim, a furrow opening disk carried adjacent the sides of the wheel and diagonally disposed to throw the displaced earth onto the rim of the wheel, and a seed delivery device in rear of the disk.

5. In a planter, a ground wheel having means to prevent earth passing therethrough, a furrow opener arranged to throw the displaced earth from the furrow inside the rim of the ground wheel, a seed delivery device arranged in rear of the furrow opener, and means to adjust the furrow opener relative to said wheel.

6. In a planter, a ground wheel having means to prevent earth passing therethrough, a furrow opener arranged to throw the displaced earth from the furrow inside the rim of the ground wheel, a seed delivery device arranged in rear of the furrow opener, and means to adjust the furrow opener relative to said wheel, said means being also arranged to adjust said seed delivery device with the furrow opener.

7. In a planter, a frame, an axle rotatably mounted on said frame, a pair of ground wheels fixed to said axle, each of said ground wheels being provided with a rim arcuate in cross section and having its convex side outward, a guard plate extending inwardly from the central portion of each wheel rim, a furrow opening disk supported adjustably from the frame to lie adjacent the inner sides of respective wheels at an inclination thereto as to throw the earth displaced onto the inside of the wheel rims, seed hoppers carried by the frame, a dropper mechanism connected to the hoppers, driving means connecting the dropper mechanism with the axle, seed chutes leading from the dropper mechanism, boots fixed in the rear of the disks and movable therewith, said boots being telescopically connected to the chutes, and means to adjust the disks and boots relative to the rims of said wheels.

In testimony whereof we affix our signatures, in the presence of two witnesses.

CHARLES B. SMITH.
LINWOOD L. MILLER.

Witnesses:
H. C. PEARSON,
J. H. SMITH.

Copies of this patent may be obtained for five cents each, by addressing the "Commissioner of Patents, Washington, D. C."